United States Patent
Betschinger et al.

(10) Patent No.: US 12,195,486 B2
(45) Date of Patent: Jan. 14, 2025

(54) PROCESS FOR CONVERTING ORGANOSILANES

(71) Applicant: Wacker Chemie AG, Munich (DE)

(72) Inventors: Frank Betschinger, Altötting (DE); Andreas Bockholt, Munich (DE); Manfred Böck, Burghausen (DE); Gerald Fleischmann, Burghausen (DE); Klaus Käppler, Burghausen (DE)

(73) Assignee: Wacker Chemie AG, Munich (DE)

( * ) Notice: Subject to any disclaimer, the term of this patent is extended or adjusted under 35 U.S.C. 154(b) by 451 days.

(21) Appl. No.: 17/625,128

(22) PCT Filed: Nov. 14, 2019

(86) PCT No.: PCT/EP2019/081260
§ 371 (c)(1),
(2) Date: Jan. 6, 2022

(87) PCT Pub. No.: WO2021/004648
PCT Pub. Date: Jan. 14, 2021

(65) Prior Publication Data
US 2022/0363698 A1    Nov. 17, 2022

(30) Foreign Application Priority Data
Jul. 10, 2019 (WO) ................ PCT/EP2019/068576

(51) Int. Cl.
*C07F 7/12* (2006.01)
(52) U.S. Cl.
CPC .................... *C07F 7/125* (2013.01)
(58) Field of Classification Search
CPC ...................................... C07F 7/125
See application file for complete search history.

(56) References Cited

U.S. PATENT DOCUMENTS

| | | | |
|---|---|---|---|
| 4,158,010 A | 6/1979 | Graf et al. | |
| 4,721,559 A * | 1/1988 | Olah .................. | C08G 65/20 |
| | | | 585/446 |
| 2003/0109735 A1 | 6/2003 | Tsukuno et al. | |
| 2011/0196165 A1* | 8/2011 | Mautner .............. | C07F 7/126 |
| | | | 556/469 |

FOREIGN PATENT DOCUMENTS

| | | | | |
|---|---|---|---|---|
| CN | 105753895 A * | 7/2016 | ........... | B01J 31/063 |
| FR | 2787792 A1 * | 6/2000 | ............. | C07F 7/125 |
| JP | 2003055387 A | 2/2003 | | |
| JP | 2012506890 A | 3/2012 | | |

OTHER PUBLICATIONS

D. T. Richens, 105, Chemical reviews 1961-2002 (2005) (Year: 2005).*
Triflate-Wikipeda (Year: 2024).*
Simon G et al: "Nouvelles Syntheses DE ME2SICL2 et ME3SICL", Journal of Organometallic Chemistry, Elsevier, Amsterdam, NL, vol. 206, Jan. 1, 1981, pp. 279-286.
W. Noll, Chemistry and Technology of Silicones, 1968, pp. 57-58.

* cited by examiner

*Primary Examiner* — Alexander R Pagano
*Assistant Examiner* — Frank S. Hou

(57) ABSTRACT

A method for converting organosilanes by reacting at least one silane (1) of the general formula $$R_a SiCl_{4-a} \qquad (I)$$

with at least one further silane (2) of the general formula $$R_b SiCl_{4-b} \qquad (II)$$

wherein silane (2) is identical or different from silane (1), optionally with additional use of silanes (3) which contain Si-bonded hydrogen and have the formula $$R_d H_e SiCl_{4-d-e} \qquad (III)$$

in the presence of aluminum salts, preferably aluminum halides, as catalysts and in the presence of cocatalysts, to obtain at least one silane (4) which differs from silanes (1) and (2) and has the general formula $$R_c SiCl_{4-c} \qquad (IV).$$

13 Claims, No Drawings

PROCESS FOR CONVERTING ORGANOSILANES

CROSS-REFERENCE TO RELATED APPLICATION

This application is a U.S. National Phase Application of PCT/EP2019/065735, filed Nov. 14, 2019, which claims priority to PCT/EP2019/068576, filed Jul. 10, 2019, the contents of each PCT patent application is hereby incorporated by reference in their entirety.

BACKGROUND

The invention relates to a method for converting organosilanes.

The conversion of organosilanes by ligand exchange, for example the exchange of methyl groups for chlorine atoms at the silicon atom, by coproportionating two or more differently substituted silanes, in the presence of catalysts such as aluminum trichloride, is known from W. Noll, Chemistry and Technology of Silicones, 1968, pages 57-58. Because of the low activity of aluminum trichloride, the reaction rate of these ligand exchange reactions is low and therefore not very economical.

U.S. Pat. No. 4,158,010 A describes the conversion of organosilanes by reacting at least one silane (1) of the general formula $$R_aSiCl_{4-a} \quad (I)$$

with at least one silane (2) which differs from silane (1) and has the general formula $$R_bSiCl_{4-b} \quad (II),$$

wherein R denotes in each case identical or different alkyl radicals having 1 to 4 carbon atoms, a is 2, 3 or 4 and b is 0, 1, 2 or 3, in the presence of aluminum catalysts, such as aluminum trichloride, and silanes containing Si-bonded hydrogen and hydrogen chloride as cocatalysts.

Hydrogen chloride has the drawback that it can have corrosive effects in plants constructed from steel, in particular in the presence of traces of water.

US 2003/0109735 A1 discloses, in addition to the use of aluminum trichloride or aluminum tribromide and hydrogen-containing silanes, metal salts as cocatalysts. This has the disadvantage that relatively large amounts of solid substances are used, which are difficult to meter and have to be removed again in a complex manner when working up the reaction mixture.

The object was to provide a method for converting organosilanes, in which the abovementioned disadvantages are avoided and which has a shortening of the reaction time and hence has improved economy.

BRIEF SUMMARY

Embodiments of a method for converting organosilanes are provided. In an embodiment, the method comprises reacting at least one silane (1) of the general formula $$R_aSiCl_{4-a} \quad (I)$$

with at least one further silane (2) of the general formula $$R_bSiCl_{4-b} \quad (II)$$

wherein silane (2) is identical or different from silane (1), optionally with additional use of silanes (3) which contain Si-bonded hydrogen and have the formula $$R_aH_eSiCl_{4-d-e} \quad (III)$$

in the presence of aluminum salts as catalysts and in the presence of cocatalysts, to obtain at least one silane (4) which differs from silanes (1) and (2) and has the general formula $$R_cSiCl_{4-c} \quad (IV),$$

wherein R denotes in each case identical or different alkyl radicals having 1 to 4 carbon atoms or a phenyl radical,
a is 2, 3 or 4,
b is 0, 1, 2 or 3,
c is 1, 2 or 3,
d is 0, 1, 2 or 3 and
e is 1, 2 or 3,
with the proviso that the sum total of d+e is at most 4, characterized in that the cocatalysts used are those selected from the group of trifluoromethanesulfonic acid, trifluoromethanesulfonic esters, aluminum tris(trifluoromethanesulfonate), metal salts of yttrium and hafnium, metal salts of the lanthanides and actinides, and mixtures of these cocatalysts.

DETAILED DESCRIPTION

The object is achieved by the invention.

The invention provides a method for converting organosilanes by reacting at least one silane (1) of the general formula $$R_aSiCl_{4-a} \quad (I)$$

with at least one further silane (2) of the general formula $$R_bSiCl_{4-b} \quad (II)$$

wherein silane (2) is identical or different from silane (1), preferably different from silane (1), optionally with additional use of silanes (3) which contain Si-bonded hydrogen and have the formula $$R_aH_eSiCl_{4-d-e} \quad (III)$$

in the presence of aluminum salts, preferably aluminum halides, as catalysts and in the presence of cocatalysts to obtain at least one silane (4) which differs from silanes (1) and (2) and has the general formula $$R_cSiCl_{4-c} \quad (IV),$$

wherein R denotes in each case identical or different alkyl radicals having 1 to 4 carbon atoms or a phenyl radical,
a is 2, 3 or 4,
b is 0, 1, 2 or 3,
c is 1, 2 or 3,
d is 0, 1, 2 or 3 and
e is 1, 2 or 3,
with the proviso that the sum total of d+e is at most 4, characterized in that the cocatalysts used are those selected from the group of trifluoromethanesulfonic acid, trifluoromethanesulfonic esters, aluminum tris(trifluoromethanesulfonate), metal salts of the 3rd and 4th transition group of the periodic table, metal salts of the lanthanides and actinides, and mixtures of these cocatalysts.

The catalysts used are preferably aluminum halides. Examples of aluminum halides are aluminum tribromide and aluminum trichloride.

The catalyst used is preferably aluminum trichloride.

Examples of trifluoromethanesulfonic esters are silyl trifluoromethanesulfonates such as trimethylsilyl trifluoromethanesulfonate.

The cocatalysts according to the invention are not catalytically active compounds themselves. Neither aluminum tris(trifluoromethanesulfonate) nor products of reaction of aluminum trichloride with trifluoromethanesulfonic acid or trifluoromethanesulfonic acid nor trimethylsilyl trifluoromethanesulfonate are catalytically active taken alone. It was therefore surprising that the addition of the cocatalysts according to the invention to aluminum trichloride brought about a considerable improvement in the catalytic activity of aluminum trichloride, which resulted in a marked shortening of the reaction time. It can be assumed that trifluoromethanesulfonic acid together with chlorosilanes form the corresponding silyl trifluoromethanesulfonates which then presumably act as cocatalysts.

It was also surprisingly found that metal salts of metals of the 3rd and 4th transition group or metal salts of the lanthanides and actinides, which taken alone are not catalytically active, can also considerably accelerate the reaction as cocatalysts in combination with the catalyst aluminum trichloride.

The metal salts used may be halides, preferably fluorides, chlorides or bromides, preferably chlorides; sulfonates; oxides or carboxylates.

Examples of metals of the 3rd and 4th transition group are yttrium and hafnium.

Examples of metals of the lanthanides and actinides are lanthanum, cerium, praseodymium, neodymium, samarium, europium, gadolinium, terbium, dysprosium, holmium, erbium, thulium, ytterbium and lutetium,
cerium, gadolinium and terbium being preferred.

Examples of metal salts of the 3rd and 4th transition group are yttrium trichloride and hafnium tetrachloride.

Examples of metal salts of the lanthanides and actinides are lanthanum trichloride, cerium trichloride, praseodymium trichloride, neodymium trichloride, samarium trichloride, gadolinium trifluoride, gadolinium trichloride, gadolinium tribromide, terbium trichloride, holmium trichloride, erbium trichloride, thulium trichloride, lutetium trichloride, dysprosium tris(trifluoromethanesulfonate), gadolinium(III) oxide and gadolinium(III) acetate.

Preferred metal salts are yttrium trichloride, cerium trichloride, neodymium trichloride, gadolinium trifluoride, gadolinium trichloride, gadolinium tribromide, gadolinium (III) acetate, terbium trichloride, holmium trichloride and lutetium trichloride, with cerium trichloride, gadolinium trichloride and terbium trichloride being particularly preferred.

Examples of alkyl radicals R having 1 to 4 carbon atoms are the methyl, ethyl, n-propyl, isopropyl, n-butyl, isobutyl and sec-butyl radicals, with the methyl radical being preferred.

Examples of silanes (1) of formula (I) are tetramethylsilane, trimethylchlorosilane, dimethyldichlorosilane and phenyltrichlorosilane, with tetramethylsilane being a preferred example.

Examples of silanes (2) of formula (II) are dimethyldichlorosilane, methyltrichlorosilane and tetrachlorosilane.

Examples of silanes (3) of formula (III) are methyldichlorosilane, dimethylchlorosilane, trichlorosilane and monochlorosilane.

Examples of silanes (4) of formula (IV), which are obtained via the ligand exchange reactions in the method according to the invention, are trimethylchlorosilane, dimethyldichlorosilane and methyltrichlorosilane.

In the method according to the invention, silane (1) of formula (I) is preferably used in amounts of 0.8 to 1.2 mol per mole of silane (2) of formula (II).

If silanes (3) containing Si-bonded hydrogen are additionally used in the method according to the invention, they are used in amounts of 0.01% to 10% by weight, preferably in amounts of 0.1% to 3% by weight, based in each case on the total weight of silanes (1) and (2).

The aluminum trichloride used as catalyst can also be produced in situ, for example by the reaction of ethylaluminum sesquichloride with hydrogen chloride.

In the method according to the invention, aluminum trichloride is used in amounts of by preference 0.2% to 10% by weight, preferably of 0.8% to 3.0% by weight, based in each case on the total weight of silanes (1) and (2) used.

In the method according to the invention, the cocatalysts are used in amounts, based on aluminum trichloride, of by preference 1% to 25% by weight, preferably 1% to 10% by weight.

The cocatalysts are thus used in the method according to the invention in amounts, based on the total weight of silanes (1) and (2) used, of by preference 0.002% to 2.5% by weight, preferably 0.008% to 0.3% by weight.

The method according to the invention is conducted by preference at 0° C. to 200° C., preferably 20° C. to 100° C., and at a pressure of by preference 1 to 100 bar, preferably 1 to 10 bar, particularly preferably at the pressure of the ambient atmosphere, that is to say at about 1 bar.

The method according to the invention can be conducted in a batchwise, semi-continuous or fully continuous manner.

The method according to the invention has the advantage that the reaction time is considerably shortened. The shortened reaction time brings about a higher plant capacity and an improved economy as a result of increasing the space-time yield.

The method according to the invention also has the advantage that it not only shortens the reaction time for the reaction of tetramethylsilane with dimethyldichlorosilane to give trimethylchlorosilane, but also shortens the reaction time for slower ligand exchange reactions such as for example for the reaction of tetramethylsilane with tetrachlorosilane or methyltrichlorosilane. The reaction time for the reaction of trimethylchlorosilane with methyltrichlorosilane to give dimethyldichlorosilane can likewise be shortened.

The disproportionation of dimethyldichlorosilane or phenyltrichlorosilane (i.e. silane (2) is identical to silane (1)) can likewise be conducted with a shorter reaction time with the method according to the invention.

EXAMPLES 1 TO 14 AND COMPARATIVE EXPERIMENTS 1 TO 5

Reaction of tetramethylsilane with dimethyldichlorosilane

Examples 1 to 14 and comparative experiments 1 to 5 were carried out under inert conditions in a three-neck flask with stirrer, reflux condenser (operated with a cryostat), dropping funnel and reaction temperature measurement. Dimethyldichlorosilane was initially charged and to this was added the catalyst and cocatalyst (examples 1-14). For comparative experiments 1 and 5 only the catalyst was added, and for comparative experiments 2 to 4 only the cocatalysts were added.

Technical-grade tetramethylsilane (approx. 85% by weight, determined by gas chromatography (GC), containing approx. 3-5% by weight of dimethylchlorosilane) was subsequently metered in.

The mixture was heated to reflux and samples were taken at regular intervals. The samples were distilled to remove the solids contents and the distillate was analyzed by means of gas chromatography (GC, column: Agilent DB 210, length: 60 m, diameter: 0.32 mm).

Example 1

150 g of dimethyldichlorosilane
115 g of technical-grade tetramethylsilane
8 g of $AlCl_3$
1.5 g of trifluoromethanesulfonic acid After a reaction time of 105 min, the remaining tetramethylsilane content was less than 1% by weight and the content of trimethylchlorosilane was 86% by weight.

Example 2

150 g of dimethyldichlorosilane
115 g of technical-grade tetramethylsilane
8 g of $AlCl_3$
1.5 g of trimethylsilyl trifluoromethanesulfonate After a reaction time of 120 min, the remaining tetramethylsilane content was approx. 1% by weight and the content of trimethylchlorosilane was 86% by weight.

Example 3

150 g of dimethyldichlorosilane
115 g of technical-grade tetramethylsilane
8 g of $AlCl_3$
1.5 g of aluminum tris(trifluoromethanesulfonate)

After a reaction time of 120 min, the remaining tetramethylsilane content was approx. 1% by weight and the content of trimethylchlorosilane was 86% by weight.

Example 4

150 g of dimethyldichlorosilane
115 g of technical-grade tetramethylsilane
8 g of $AlCl_3$
1.5 g of cerium trichloride After a reaction time of 95 min, the remaining tetramethylsilane content was approx. 1% by weight and the content of trimethylchlorosilane was 86% by weight.

Example 5

150 g of dimethyldichlorosilane
115 g of technical-grade tetramethylsilane
8 g of $AlCl_3$
1.5 g of gadolinium trichloride After a reaction time of 60 min, the remaining tetramethylsilane content was approx. 1% by weight and the content of trimethylchlorosilane was 86% by weight.

Example 6

1.45 t of dimethyldichlorosilane
1 t of technical-grade tetramethylsilane
18 kg of $AlCl_3$ (produced in situ from 16.7 kg of ethylaluminum sesquichloride and hydrogen chloride)
2.5 kg of trifluoromethanesulfonic acid After a reaction time of 4 h under reflux conditions, the remaining tetramethylsilane content was approx. 2% by weight and the content of trimethylchlorosilane was 85% by weight.

Example 7

The final reaction mixture from example 6 was worked up by distillation and to the remaining distillation bottoms of approx. 0.15 t were added 1.45 t of dimethyldichlorosilane and 1 t of technical-grade tetramethylsilane, and the mixture was reacted analogously to example 6. After a reaction time of 4 h, the remaining tetramethylsilane content was approx. 2% by weight and the content of trimethylchlorosilane was 85% by weight.

Example 8

1.45 t of dimethyldichlorosilane
1 t of technical-grade tetramethylsilane
18 kg of $AlCl_3$ (produced in situ from 16.7 kg of ethylaluminum sesquichloride and hydrogen chloride)
1.0 kg of cerium trichloride After a reaction time of 1 h, the remaining tetramethylsilane content was approx. 1% by weight and the content of trimethylchlorosilane was 86% by weight.

Example 9

The final reaction mixture from example 8 was worked up by distillation and to the remaining distillation bottoms of approx. 0.15 t were added 1.45 t of dimethyldichlorosilane and 1 t of technical-grade tetramethylsilane, and the mixture was reacted analogously to example 8. After a reaction time of 1 h, the remaining tetramethylsilane content was approx. 1% by weight and the content of trimethylchlorosilane was 86% by weight.

Example 10

150 g of dimethyldichlorosilane
115 g of technical-grade tetramethylsilane
6 g of $AlCl_3$
1 g of terbium trichloride After a reaction time of 60 min at 40° C., the remaining tetramethylsilane content was approx. 1% by weight and the content of trimethylchlorosilane was 86% by weight.

Example 11

150 g of dimethyldichlorosilane
115 g of technical-grade tetramethylsilane
6 g of $AlCl_3$
1 g of gadolinium trifluoride After a reaction time of 60 min at 40° C., the remaining tetramethylsilane content was approx. 1% by weight and the content of trimethylchlorosilane was 86% by weight.

Example 12

150 g of dimethyldichlorosilane
115 g of technical-grade tetramethylsilane
6 g of $AlCl_3$
1 g of gadolinium tribromide After a reaction time of 60 min at 40° C., the remaining tetramethylsilane content was approx. 1% by weight and the content of trimethylchlorosilane was 86% by weight.

Example 13

150 g of dimethyldichlorosilane
115 g of technical-grade tetramethylsilane
6 g of $AlCl_3$
0.1 g of gadolinium trichloride After a reaction time of 60 min at 40° C., the remaining tetramethylsilane content was approx. 1% by weight and the content of trimethylchlorosilane was 86% by weight.

Example 14

150 g of dimethyldichlorosilane
115 g of technical-grade tetramethylsilane
6 g of AlBr$_3$
0.3 g of gadolinium trichloride After a reaction time of 60 min at 40° C., the remaining tetramethylsilane content was approx. 1% by weight and the content of trimethylchlorosilane was 86% by weight.

Comparative Experiment 1

150 g of dimethyldichlorosilane
115 g of technical-grade tetramethylsilane
8 g of AlCl$_3$ After a reaction time of 120 min, the remaining tetramethylsilane content was approx. 23% by weight; the content of trimethylchlorosilane was 34% by weight. Only after a reaction time of 360 min under reflux conditions was the remaining tetramethylsilane content approx. 1% by weight and the content of trimethylchlorosilane 86% by weight.

Comparative Experiment 2

150 g of dimethyldichlorosilane
115 g of technical-grade tetramethylsilane
8 g of trifluoromethanesulfonic acid After a reaction time of 120 min it was not possible to detect any conversion, that is to say any change in the composition of the silane mixture.

Comparative Experiment 3

150 g of dimethyldichlorosilane
115 g of technical-grade tetramethylsilane
8 g of aluminum tris(trifluoromethanesulfonate)

After a reaction time of 120 min it was not possible to detect any conversion, that is to say any change in the composition of the silane mixture.

Comparative Experiment 4

150 g of dimethyldichlorosilane
115 g of technical-grade tetramethylsilane
9.5 g of reaction product of aluminum trichloride and trifluoromethanesulfonic acid After a reaction time of 120 min it was not possible to detect any conversion, that is to say any change in the composition of the silane mixture.

Comparative Experiment 5

Example 6 was repeated with the modification that no trifluoromethanesulfonic acid was added. After a reaction time of 12 h under reflux conditions, the remaining tetramethylsilane content was approx. 2% by weight and the content of trimethylchlorosilane was 85% by weight.

Examples 15 to 30 and comparative experiments 6 to 8: Reaction of tetramethylsilane with tetrachlorosilane A mixture of tetrachlorosilane and technical-grade tetramethylsilane (TMS, approx. 85% by weight determined by gas chromatography (GC)) with a content of tetramethylsilane of 46 mol % and tetrachlorosilane of 47 mol % (the remainder consists inter alia of methylchlorohydrogensilanes and chlorohydrogensilanes) is heated to 100° C. under inert conditions with 2 mol %

(mol % based on the silanes) of aluminum trichloride and 0.5 mol % (mol % based on the silanes) of cocatalyst as per table 1 in an autoclave for 4 h with stirring. After cooling, the sedimented catalyst is removed and the reaction product is analyzed using $^{29}$Si NMR. The results are summarized in table 1.

TABLE 1

| Comp. experiments/ Examples | Co-catalyst | % TMS converted | Starting materials remaining in the reaction mixture | | Target products in the reaction mixture | | |
|---|---|---|---|---|---|---|---|
| | | | Si(CH$_3$)$_4$ mol % | SiCl$_4$ mol % | CH$_3$SiCl$_3$ mol % | (CH$_3$)$_2$SiCl$_2$ mol % | (CH$_3$)$_3$SiCl mol % |
| C 6 | — | 14.6 | 39.6 | 43.6 | — | — | 14.6 |
| C 7* | — | 19.0 | 37.7 | 43 | — | — | 16 |
| C 8** | GdCl$_3$ | 3 | 48.5 | 50.7 | — | — | 0.7 |
| E 15 | HfCl$_4$ | 36 | 29.7 | 42.2 | — | — | 24.1 |
| E 16 | LaCl$_3$ | 32.2 | 31.4 | 43.3 | — | — | 21.9 |
| E 17 | SmCl$_3$ | 57.9 | 19.5 | 40.1 | — | — | 36.7 |
| E 18 | YCl$_3$ | 78.4 | 10.0 | 37.8 | — | — | 48.9 |
| E 19 | Dy(CF$_3$SO$_3$)$_3$ | 26.7 | 34.0 | 44.3 | — | — | 18.6 |
| E 20 | TbCl$_3$ | 97.0 | 1.4 | 34.6 | — | 1.6 | 58.8 |
| E 21 | Gd(CH$_3$COO)$_3$ | 73.1 | 12.5 | 39.1 | — | — | 46 |
| E 22 | NdCl$_3$ | 75.5 | 11.4 | 38.1 | — | 0.1 | 47 |
| E 23 | GdCl$_3$ | 98.5 | 0.5 | 44.6 | — | 3.8 | 58 |
| E 24 | CeCl$_3$ | 50.4 | 18.2 | 39.6 | — | — | 38.1 |
| E 25 | PrCl$_3$ | 64.6 | 16.3 | 39 | — | 0.1 | 41 |
| E 26 | TmCl$_3$ | 40.8 | 27.3 | 43.5 | — | — | 25.8 |
| E 27 | Gd$_2$O$_3$*** | 49.2 | 23.4 | 41.5 | — | — | 32.0 |
| E 28 | LuCl$_3$ | 77.2 | 10.5 | 37.3 | — | 0.2 | 48.8 |
| E 29 | ErCl$_3$ | 59.7 | 18.5 | 40.2 | — | — | 37 |
| E 30 | HoCl$_3$ | 84.7 | 7.0 | 36.2 | — | — | 53.9 |

*2.5 mol % aluminum trichloride
**mixture of 50 mol % pure tetramethylsilane and 50 mol % silicon tetrachloride (the mixture does not contain any H-Si compound). No catalyst (AlCl$_3$) is used.
***0.5 mol % of cocatalyst, based on gadolinium

Examples 31 and 32

Reaction of Tetramethylsilane with Methyltrichlorosilane

A mixture of tetrachlorosilane and technical-grade tetramethylsilane (TMS, approx. 85% by weight determined by gas chromatography (GC)) with a content of tetramethylsilane of 48 mol % and methyltrichlorosilane of 48 mol % (the remainder consists inter alia of methylchlorohydrogensilanes and chlorohydrogensilanes) is heated to 80° C. under inert conditions with 2 mol % (mol % based on the silanes) of aluminum trichloride and 0.5 mol % (mol % based on the silanes) of cocatalyst as per table 2 in an autoclave for 4 h with stirring. After cooling, the sedimented catalyst is removed and the reaction product is analyzed using $^{29}Si$ NMR. The results are summarized in table 2.

TABLE 2

| Examples | Co-catalyst | % TMS converted | Starting materials remaining in the reaction mixture | | Target products in the reaction mixture | |
|---|---|---|---|---|---|---|
| | | | $Si(CH_3)_4$ mol % | $CH_3SiCl_3$ mol % | $(CH_3)_2SiCl_2$ mol % | $(CH_3)_3SiCl$ mol % |
| E 31 | $GdCl_3$ | 100 | 0 | 2.1 | 54.3 | 42.6 |
| E 32 | $CeCl_3$ | 99.8 | 0.1 | 12.1 | 35.1 | 51.1 |

Example 33

Reaction of Trimethylchlorosilane with Methyltrichlorosilane

A mixture of 47.5 mol % trimethylchlorosilane and 47.5 mol % methyltrichlorosilane, containing 2.5 mol % of dimethylchlorosilane and 2.5 mol % methyldichlorosilane, is heated to 80° C. under inert conditions with 2 mol % (mol % based on the silanes) of aluminum trichloride and 0.5 mol % (mol % based on the silanes) of cocatalyst as per table 3 in an autoclave for 4 h with stirring. After cooling, the sedimented catalyst is removed and the reaction product is analyzed using $^{29}Si$ NMR. The results are summarized in table 3.

TABLE 3

| Examples | Co-catalyst | Starting materials remaining in the reaction mixture | | Target product in the reaction mixture |
|---|---|---|---|---|
| | | $(CH_3)_3SiCl$ mol % | $CH_3SiCl_3$ mol % | $(CH_3)_2SiCl_2$ mol % |
| E 33 | $GdCl_3$ | 17.3 | 15.6 | 63 |

Example 34

Disproportionation of Dimethyldichlorosilane

A mixture of 95 mol % dimethyldichlorosilane, 2.5 mol % dimethylchlorosilane and 2.5 mol % methyldichlorosilane is heated to 100° C. under inert conditions with 2 mol % (mol % based on the silanes) of aluminum trichloride and 0.5 mol % (mol % based on the silanes) of cocatalyst as per table 4 in an autoclave for 4 h with stirring. After cooling, the sedimented catalyst is removed and the reaction product is analyzed using $^{29}Si$ NMR. The results are summarized in table 4.

TABLE 4

| Example | Cocatalyst | Starting material remaining in the reaction mixture | Target products in the reaction mixture | |
|---|---|---|---|---|
| | | $(CH_3)_2SiCl_2$ mol % | $(CH_3)_3SiCl$ mol % | $CH_3SiCl_3$ mol % |
| E 34 | $GdCl_3$ | 88 | 4.4 | 4.1 |

Example 35

Disproportionation of Phenyltrichlorosilane

A mixture of 95 mol % phenyltrichlorosilane, 2.5 mol % dimethylchlorosilane and 2.5 mol % methyldichlorosilane is heated to 100° C. under inert conditions with 2 mol % (mol % based on the silanes) of aluminum trichloride and 0.5 mol % (mol % based on the silanes) of cocatalyst as per table 5 in an autoclave for 2 h with stirring. After cooling, the sedimented catalyst is removed and the reaction product is analyzed using $^{29}Si$ NMR. The results are summarized in table 5.

TABLE 5

| Example | Cocatalyst | Starting material remaining in the reaction mixture $PhSiCl_3$ mol % | Target products in the reaction mixture $Ph_2SiCl_2$ mol % |
|---|---|---|---|
| E 35 | $GdCl_3$ | 90 | 10 |

The invention claimed is:
1. A method for converting organosilanes by reacting at least one silane (1) of the general formula

$$R_a SiCl_{4-a} \quad (I)$$

with at least one further silane (2) of the general formula $$R_b SiCl_{4-b} \quad (II)$$

wherein silane (2) is identical or different from silane (1), optionally with additional use of silanes (3) which contain Si-bonded hydrogen and have the formula $$R_aH_eSiCl_{4-d-e} \quad (III)$$

in the presence of aluminum salts, as catalysts and in the presence of cocatalysts, to obtain at least one silane (4) which differs from silanes (1) and (2) and has the general formula $$R_cSiCl_{4-c} \quad (IV),$$

wherein R denotes in each case identical or different alkyl radicals having 1 to 4 carbon atoms or a phenyl radical,
a is 2, 3 or 4,
b is 0, 1, 2 or 3,
c is 1, 2 or 3,
d is 0, 1, 2 or 3 and
e is 1, 2 or 3,
with the proviso that the sum total of d+e is at most 4,
characterized in that the cocatalysts used are those selected from the group of trifluoromethanesulfonic acid, trifluoromethanesulfonic esters, aluminum tris(trifluoromethanesulfonate), metal salts of yttrium and hafnium, metal salts of the lanthanides and actinides, and mixtures of these cocatalysts.

2. The method as claimed in claim 1, characterized in that the catalyst used is aluminum trichloride.

3. The method as claimed in claim 2, characterized in that aluminum trichloride is either used as such or is produced in situ.

4. The method as claimed in claim 2, characterized in that aluminum trichloride is produced in situ from ethylaluminum sesquichloride and hydrogen chloride.

5. The method as claimed in claim 1, characterized in that, as the metal salts of yttrium or hafnium or of the lanthanides and actinides, use is made of halides; sulfonates; oxides or carboxylates.

6. The method as claimed in claim 1, characterized in that the metals of the lanthanides and actinides that are used are lanthanum, cerium, praseodymium, neodymium, samarium, europium, gadolinium, terbium, dysprosium, holmium, erbium, thulium, ytterbium or lutetium.

7. The method as claimed in claim 1, characterized in that the metal salts used are yttrium trichloride, cerium trichloride, neodymium trichloride, gadolinium trifluoride, gadolinium trichloride, gadolinium tribromide, gadolinium (III) acetate, terbium trichloride, holmium trichloride or lutetium trichloride.

8. The method as claimed in claim 1, characterized in that aluminum salts are used in amounts of from 0.2% to 10% by weight, based in each case on the total weight of silanes (1) and (2) used.

9. The method as claimed in claim 1, characterized in that cocatalysts are used in amounts of 0.002% to 2.5% by weight, based in each case on the total weight of silanes (1) and (2) used.

10. The method as claimed in claim 1, characterized in that the silane (1) used is tetramethylsilane, trimethylchlorosilane, dimethyldichlorosilane and phenyltrichlorosilane.

11. The method as claimed in claim 1, characterized in that the silane (2) used is dimethyldichlorosilane, methyltrichlorosilane and tetrachlorosilane.

12. The method as claimed in claim 1, characterized in that the silane (1) used is tetramethylsilane and the silane (2) used is dimethyldichlorosilane, with trimethylchlorosilane being obtained.

13. The method as claimed in claim 1, characterized in that the silane (1) used is tetramethylsilane and the silane (2) used is tetrachlorosilane, with trimethylchlorosilane being obtained.

* * * * *